US012784443B2

(12) United States Patent
Deshpande et al.

(10) Patent No.: US 12,784,443 B2
(45) Date of Patent: Nov. 3, 2026

(54) METHOD AND SYSTEM TO CALCULATE NET CARBON SEQUESTRATION FOR AGRICULTURE USING REMOTE SENSING DATA

(71) Applicant: Tata Consultancy Services Limited, Mumbai (IN)

(72) Inventors: Shailesh Shankar Deshpande, Pune (IN); Jayantrao Mohite, Thane (IN); Mariappan Sakkan, Chennai (IN); Suryakant Ashok Sawant, Thane (IN); Srinivasu Pappula, Hyderabad (IN); Balamuralidhar Purushothaman, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 487 days.

(21) Appl. No.: 18/385,581

(22) Filed: Oct. 31, 2023

(65) Prior Publication Data

US 2024/0185598 A1 Jun. 6, 2024

(30) Foreign Application Priority Data

Dec. 1, 2022 (IN) ............................ 202221069486

(51) Int. Cl.
*G06V 20/10* (2022.01)
*G06Q 30/018* (2023.01)
(Continued)

(52) U.S. Cl.
CPC ......... *G06V 20/188* (2022.01); *G06Q 30/018* (2013.01); *G06Q 50/02* (2013.01);
(Continued)

(58) Field of Classification Search
CPC .... G06V 20/188; G06V 20/194; G06V 20/50; G06V 10/774; G06V 10/764;
(Continued)

(56) References Cited

U.S. PATENT DOCUMENTS

| | | | | |
|---|---|---|---|---|
| 2022/0138649 | A1* | 5/2022 | Ashtekar | A01B 69/001 705/7.36 |
| 2022/0138767 | A1 | 5/2022 | Ashtekar et al. | |
| 2022/0148305 | A1* | 5/2022 | Adams | G06Q 30/018 |
| 2024/0354851 | A1* | 10/2024 | Stolt | G06Q 50/02 |
| 2025/0173749 | A1* | 5/2025 | Guan | G06Q 30/0202 |

OTHER PUBLICATIONS

Turner, David P., Michael Guzy, Michael A. Lefsky, William D. Ritts, Steve Van Tuyl, and Beverly E. Law. "Monitoring forest carbon sequestration with remote sensing and carbon cycle modeling." Environmental management 33, No. 4 (2004): 457-466. (Year: 2004).*

(Continued)

*Primary Examiner* — David Perlman
(74) *Attorney, Agent, or Firm* — Finnegan, Henderson, Farabow, Garrett & Dunner, LLP

(57) ABSTRACT

This disclosure relates generally to method and system to calculate net carbon sequestration for agriculture using remote sensing data. Climate change is one of the factor in sustainable development on the earth and has sparked numerous initiatives to reduce earth's carbon footprint. The disclosed method processes remote sensing data comprising one or more input images indicating one or more characteristics of at least one agriculture crop of a geographical region. The method calculates a carbon footprint value of at least one agriculture crop by obtaining a plurality of carbon values associated with the geographical region. A net carbon flux of least one agriculture crop is calculated based on the carbon footprint value, a data maturity index, and a difficulty level. The method enables growers and carbon credit purchasers to correctly determine the carbon footprint of a
(Continued)

geographical region to accurately predict the reduction of greenhouse gas emissions reducing environmental degradation.

14 Claims, 5 Drawing Sheets

(51) Int. Cl.

| | |
|---|---|
| ***G06Q 50/02*** | (2024.01) |
| ***G06V 10/764*** | (2022.01) |
| ***G06V 10/766*** | (2022.01) |
| ***G06V 10/774*** | (2022.01) |
| ***G06V 20/50*** | (2022.01) |

(52) U.S. Cl.
CPC .......... *G06V 10/764* (2022.01); *G06V 10/766* (2022.01); *G06V 10/774* (2022.01); *G06V 20/194* (2022.01); *G06V 20/50* (2022.01)

(58) Field of Classification Search
CPC .... G06V 10/766; G06Q 30/018; G06Q 50/02; G06L 50/02
See application file for complete search history.

(56) References Cited

OTHER PUBLICATIONS

Al-Mansour et al., “A model calculation of the carbon footprint of agricultural products: The case of Slovenia,” Energy (2016).
Li et al., “Calculation and Evaluation of Carbon Footprint in Mulberry Production: A Case of Haining in China,” Int. J. Environ. Res. Public Health, 17(1339) (2020).
Sah et al., “The carbon footprint of agricultural crop cultivation in India,” Carbon Management, 9(3):213-225 (2018).

* cited by examiner

METHOD AND SYSTEM TO CALCULATE NET CARBON SEQUESTRATION FOR AGRICULTURE USING REMOTE SENSING DATA

PRIORITY CLAIM

This U.S. patent application claims priority under 35 U.S.C. § 119 to: Indian Patent Application No.202221069486, filed on Dec. 1, 2022. The entire contents of the aforementioned application are incorporated herein by reference.

TECHNICAL FIELD

The disclosure herein generally relates to carbon sequestration, and, more particularly, to method and system to calculate net carbon sequestration for agriculture using remote sensing data.

BACKGROUND

Increasing concentrations of greenhouse gases in earth's atmosphere has been a growing concern for decades. Agriculture affects climate change and contributes directly and indirectly to greenhouse gas (GHG) emissions. The pursuit of sustainable development entails a strategic policy decision for all modern countries. Growers or individual farmers are motivated to reduce greenhouse gas emissions from their farms. Such emission reduction increases productivity and sustainable production over time. Carbon footprint of agricultural products is a key factor for improved efficiency and sustainability for agricultural productivity processes. Carbon footprint calculation in agriculture products is highly recommended factor in sustainability development which reduces environmental impact in supply chains. Determination of carbon footprint from the agricultural products requires detailed analysis of energy consumption in various processes of crop production. Existing techniques lack in calculating carbon sequestration based on various factors that enable growers and carbon credit purchasers to correctly determine a net carbon flux of a field under agriculture management practices.

SUMMARY

Embodiments of the present disclosure present technological improvements as solutions to one or more of the above-mentioned technical problems recognized by the inventors in conventional systems. For example, in one embodiment, a system to calculate net carbon sequestration for agriculture using remote sensing data is provided. The system includes processing remote sensing data comprising one or more input images indicating one or more characteristics of at least one agriculture crop associated with a geographical region. The method calculates a carbon footprint value of at least one agriculture crop by obtaining a plurality of carbon values associated with the geographical region. The plurality of carbon values includes an intensive tillage value from soil carbon release, a carbon sequestered in soil value, one or more agriculture crop management practices, an agricultural crop respiration loss value, and a locked carbon value above ground crop biomass. Further, a net carbon flux of least one agriculture crop is calculated based on the carbon footprint value, a data maturity index, and a difficulty level.

In accordance with an embodiment, the intensive tillage value from soil carbon release is obtained by determining land use land cover (LULC) factor for the one or more input images to identify suitable geographical region for farming based on soil carbon release. The intensive tillage value from soil carbon release for the one or more input images is determined based on a tillage depth, a plurality of soil properties, a tillage score, and a tillage weightage, wherein the plurality of soil properties comprises a soil type, a soil texture, a soil color, a line density in furrow direction, and a tillage type.

In another aspect, a method to calculate net carbon sequestration for agriculture using remote sensing data is provided. The method includes processing remote sensing data comprising one or more input images indicating one or more characteristics of at least one agriculture crop associated with a geographical region. The method calculates a carbon footprint value of at least one agriculture crop by obtaining a plurality of carbon values associated with the geographical region. The plurality of carbon values includes an intensive tillage value from soil carbon release, a carbon sequestered in soil value, one or more agriculture crop management practices, an agricultural crop respiration loss value, and a locked carbon value above ground crop biomass. Further, a net carbon flux of least one agriculture crop is calculated based on the carbon footprint value, a data maturity index, and a difficulty level.

In yet another aspect, a non-transitory computer readable medium for processing remote sensing data comprising one or more input images indicating one or more characteristics of at least one agriculture crop associated with a geographical region. The method calculates a carbon footprint value of at least one agriculture crop by obtaining a plurality of carbon values associated with the geographical region. The plurality of carbon values includes an intensive tillage value from soil carbon release, a carbon sequestered in soil value, one or more agriculture crop management practices, an agricultural crop respiration loss value, and a locked carbon value above ground crop biomass. Further, a net carbon flux of least one agriculture crop is calculated based on the carbon footprint value, a data maturity index, and a difficulty level.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
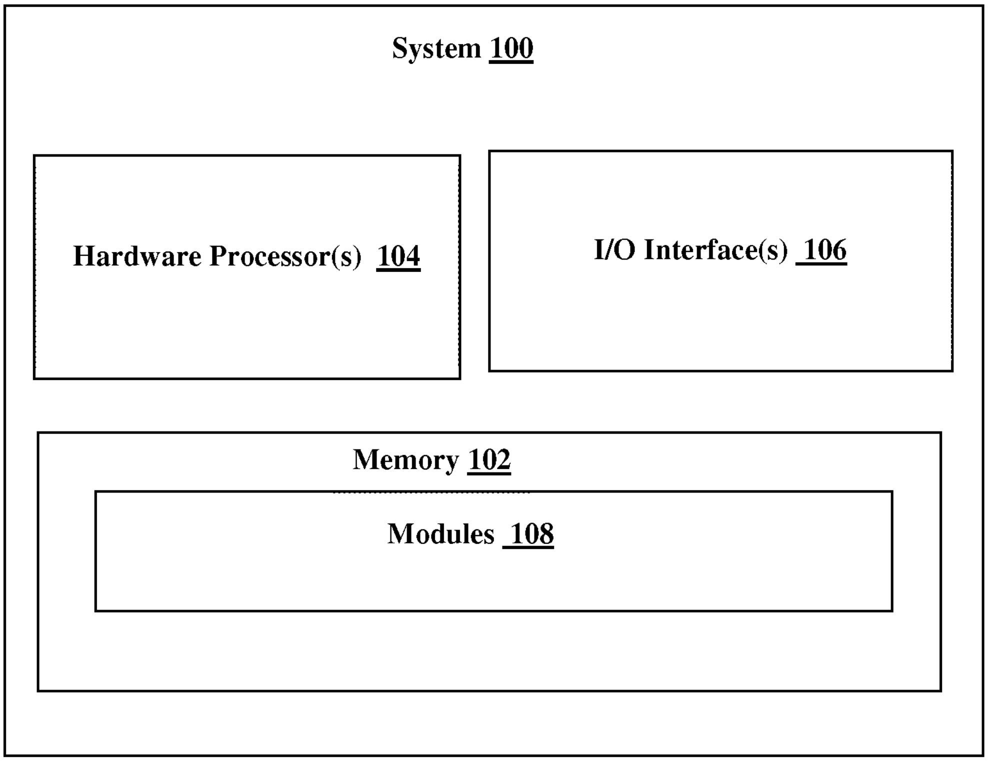
FIG. 1 is a block diagram illustrating a carbon sequestration system according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system for calculating net carbon sequestration for agriculture using remote sensing data. The system enables to calculate a net carbon flux of one or more geographical regions selected by a farmer during the season or year being more adaptable to soil for determining carbon credits. Such carbon credits helps trading platform where carbon credit buyers trade for the quantity of carbon saved for the season. The disclosed method obtains remote sensing data of each geographical region to calculate the carbon footprint value of the soil. Further, a data maturity is calculated for the carbon footprint value based on various factors affecting the geographical region to compute a net carbon flux. The disclosed system is further explained with the method as described in conjunction with FIG. 1 to FIG. 4B below.

Referring now to the drawings, and more particularly to FIG. 1 through FIG. 4B, where similar reference characters denote corresponding features consistently throughout the figures, there are shown preferred embodiments, and these embodiments are described in the context of the following exemplary system and/or method.

FIG. 1 is a block diagram illustrating a carbon sequestration system according to some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
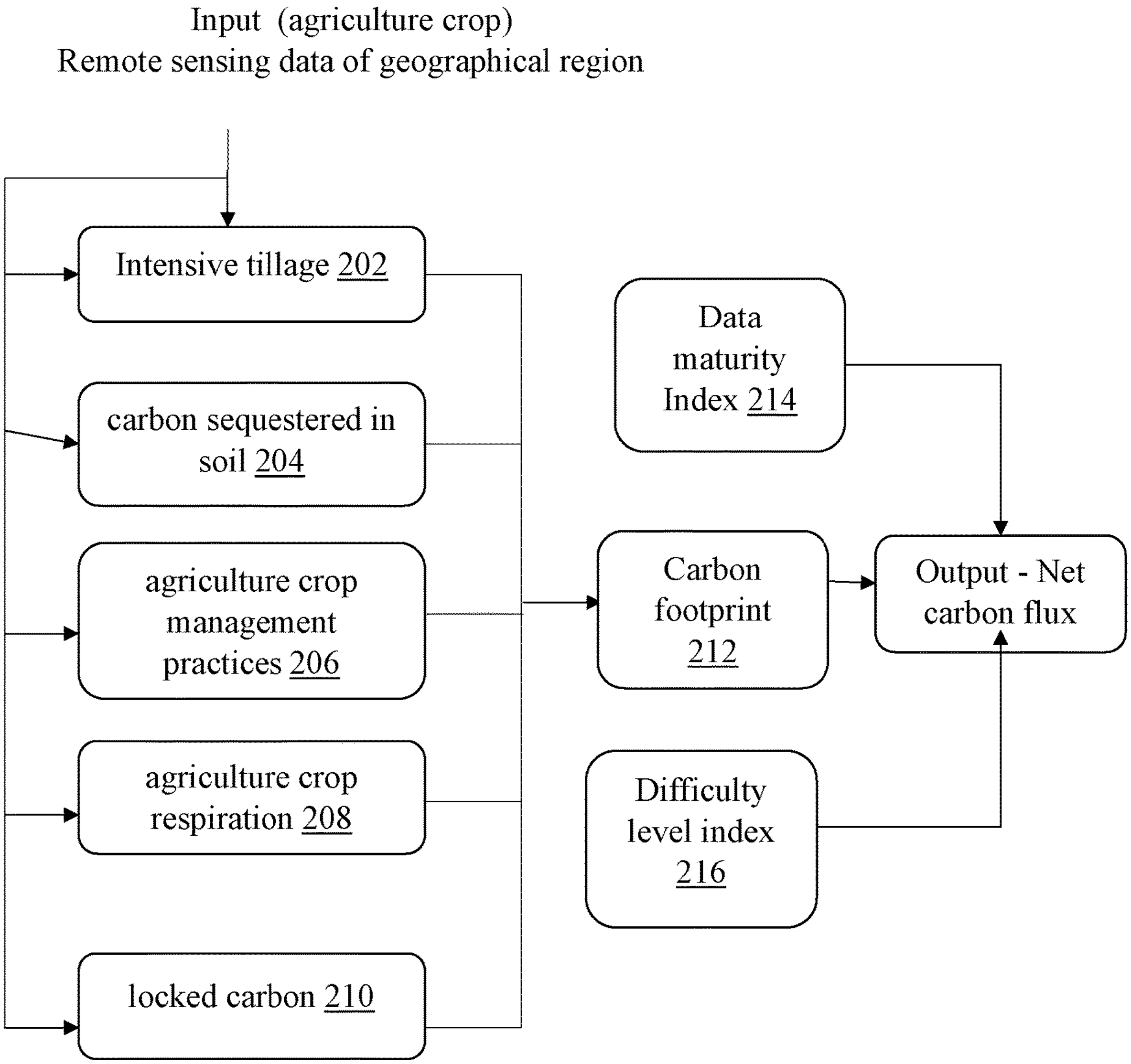
FIG. 2 is a block diagram depicting an exemplary schema of the carbon sequestration system of FIG. 1, in accordance with some embodiments of the present disclosure.

Referring to FIG. 2 is a block diagram depicting an exemplary schema of the carbon sequestration system of FIG. 1, in accordance with some embodiments of the present disclosure. The system 100 may include a plurality of components comprising an intensive tillage 202, a carbon sequestered in soil 204, an agriculture crop management practices 206, an agriculture crop respiration 208, a locked carbon 210, a carbon footprint 212, a data maturity index 214, and a difficulty level index 216 that are coupled to one or more client devices through an internet cloud. The client devices may include one or more client applications.

The system 100 receives remote sensing data of one or more geographical regions via one or more remote sensing devices configured to a remote sensing platform. The remote sensing data may include satellite/aerial images and may process the one or more images to determine a vegetative indices.

The intensive tillage 202 of the system 100 provides carbon dioxide equivalent (CO2E) released due to intensive tillage in the one or more geographical regions.

The carbon sequestered in soil 204 of the system 100 may determine the CO2 sequestered in soil below ground biomass.

The agriculture crop management practices 206 of the system 100 may access data from one or more external sources corresponding to baseline crop management practices. The agriculture crop management practices may augment sparse data to provide location specific inferences for key crop management practices but not limited to planted crop type, specific cultivar or crop variety, planting data, planting density (for example seeds per acre and row spacing), tillage, fertilizer application (for example dates and amounts), and irrigation (for example dates and amounts). The carbon dioxide equivalent (CO2E) of the crop management practices may further access data from the databases to determine one or more agriculture crop management practices (for example, crop species and maturity; planting dates; crop rotation; cover cropping; tillage type; fertilizer type, amount, and timing; and irrigation amount and timing). The one or more agriculture crop management practices are employed to construct simulation inputs to the crop for the remote sensing data for modeling of regenerative multi-year crop simulations to accurately determine the amount of carbon that may be sequestered over baseline field management.

The agriculture crop respiration 208 of the system 100 may calculate crop biomass and for each crop type the respiration loss would determine the basic metabolic requirements of the crop.

The locked carbon 210 of the system 100 may calculate the locked caron above ground biomass.

The carbon footprint 212 of the system 100 is a value calculated for the agriculture crop to determine a vegetative index.

The data maturity index 214 is one or more weightage maturity indices and the difficulty level index 216 is a categorical rate of the carbon value obtained from corresponding agriculture crop.

Figure 3:
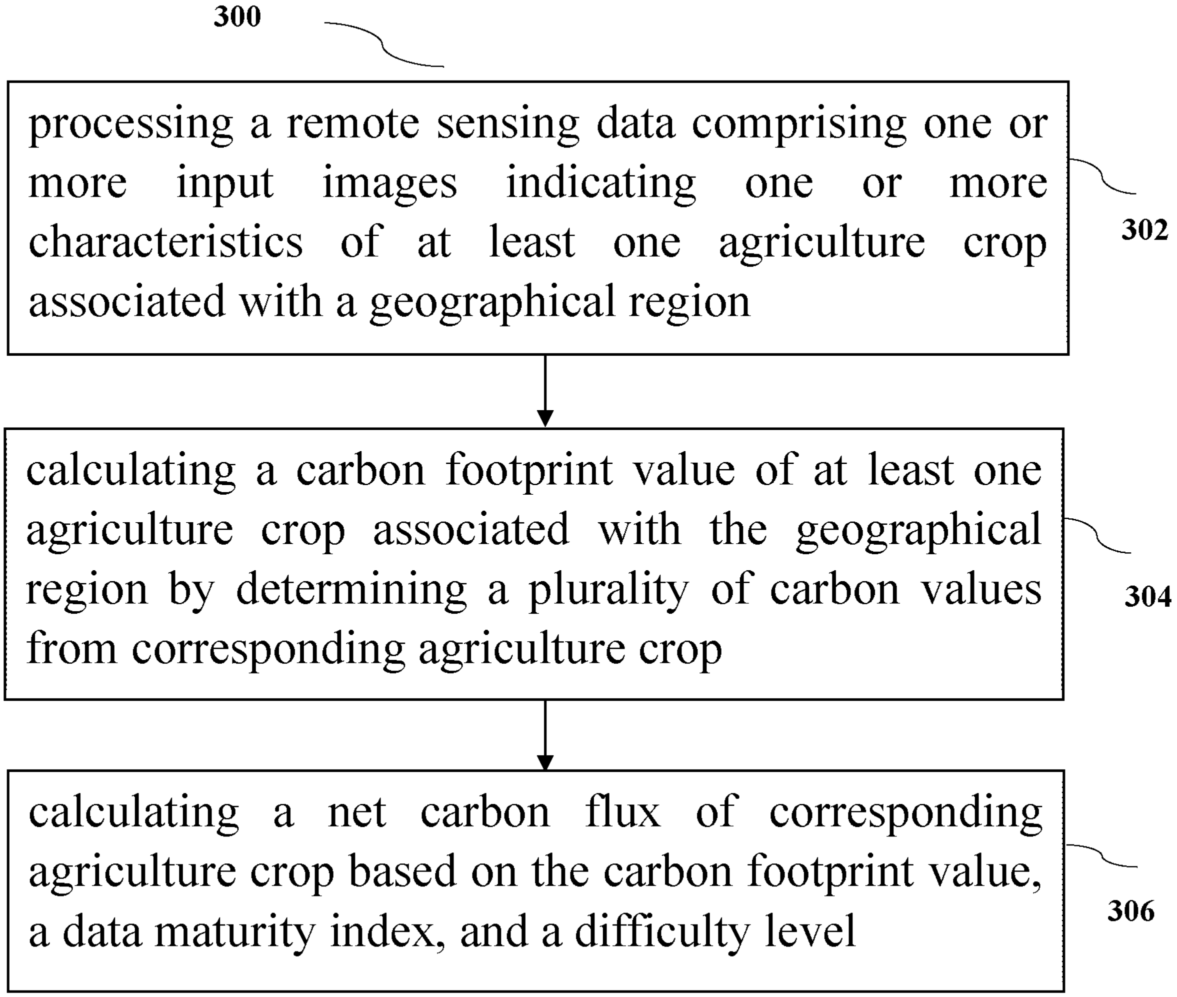
FIG. 3 is a flow diagram illustrating a method for calculating a net carbon flux using the carbon sequestration system of FIG. 1, in accordance with some embodiments of the present disclosure.

FIG. 3 is a flow diagram illustrating a method for calculating a net carbon flux using the carbon sequestration system, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 process remote sensing data comprising one or more input images indicating one or more characteristics of at least one agriculture crop associated with a geographical region. Initially, the system 100 receives the remote sensing data of the geographical region via remote sensing devices. The remote sensing data may include for example satellite/aerial images. Such remote sensing data shall not be construed as limiting the scope of the present disclosure. The one or more input images are further processed as input to the intensive tillage 202.

Referring now to the steps of the method 300, at step 304, the one or more hardware processors 104 calculate a carbon footprint value of at least one agriculture crop associated with the geographical region by obtaining a plurality of carbon values associated with the geographical region.

The remote sensing data are processed to calculate the carbon footprint value of associated agriculture crop to determine a vegetative index based on the plurality of carbon values. Here, the plurality of carbon values includes an intensive tillage value of soil carbon release, a carbon sequestered in soil, one or more agriculture crop management practices, an agricultural crop respiration loss value, and a locked carbon value above ground crop biomass.

The intensive tillage 202 of the system 100 determines land use land cover (LULC) factor for the one or more input images for identifying suitable geographical region for farming based on a soil carbon release. Here, the land use land cover factor is calculated for past predefined years (for example, say 30 years) for the geographical region. Land use class is determined based on classifying the remote sensing data or based on existing map if available. The geographical region is classified as suitable for agriculture or not suitable to agriculture during the monitoring season. Further, the correct LULC change factor is applied for carbon release when the geographical region is identified as suitable for agriculture.

Further, the intensive tillage value from soil carbon release is determined based on a tillage depth, a plurality of soil properties, a tillage score, and a tillage weightage. The plurality of soil properties comprises, but are not limited to, a soil type, a soil texture, a soil color, a line density in furrow direction, and a tillage type. The tillage score is determined based on the soil texture, the soil color, the line density in furrow direction as described in Equation 1, $$\text{Tillage score} = f\{\text{texture, color, line density in furrow direction}\} \qquad \text{Equation 1}$$

The tillage weightage is determined based on the soil texture, the soil color, and an edge density as in Equation 2, $$\begin{aligned}\text{Tillage Weightage } (1-5) = \\ &\text{texture (smooth vs rough} - \text{rough indicates deep tillage),} \\ &\text{color (lighter to darker} - \text{dark indicates tillage depth),} \\ &\text{edge density (more edge density indicates more tillage depth)}\end{aligned} \qquad \text{Equation 2}$$

Any instance of intensive tillage may be of primary or secondary at any point in time would be considered for release of carbon. The carbon release quantity would be determined based on the soil horizon layer depth profile.

The carbon sequestered in soil 204 of the system 100 acquires the one or more input images indicating agriculture crop characteristics associated with the geographical region. The soil carbon sequestered value is determined by using a pretrained carbon sequestration technique based on a carbon difference between the one or more input images indicating agriculture crop and a training dataset. The remote sensing platform collects the one or more input images of the field without the any standing crops. For the satellite platform the one or more input images having bare soil would be downloaded or acquired. Then hyperspectral data would be used for quantifying soil carbon, at surface and different depths.

The carbon sequestration technique performs the steps by obtaining the training dataset comprising one or more remote sensing training images of the geographical region. Further, a hyperspectral data is obtained from the training dataset for quantifying soil carbon at surface and at different diagnostic depths. Then, a hyperspectral signature is measured for the training dataset. Further, one or more learned model coefficients are applied over the training dataset to identify an appropriate carbon absorption band for the training dataset. A local minima in a range of specific wavelengths are determined for the carbon absorption band and a start wavelength ($W_{start}$) and an end wavelength ($W_{end}$) are located for the local minima. Further, a continuum is calculated using a second-degree polynomial joining the start wavelength and the end wavelength and a diagnostic depth is calculated for the continuum. The regression model determines a soil carbon absorption and the diagnostic depth.

Further, the one or more learned model coefficients are applied over the training dataset to get correct nitrate concentration from the soil. For low nitrate concentration whole spectrum would be utilized for pretraining carbon sequestration technique and the open field images would be taken again. The difference would determine the carbon sequestered in soil. Further, the technique calculates the crop type, the crop age and the crop biomass, and carbon rich manures added into the soil.

The agriculture crop management practices 206 of the system 100 calculates the nitrate concentration associated with water bodies of the one or more input images by determining a farming index of each agricultural crop based on a plurality of factors. The plurality of factors comprises the one or more remote sensing training images of the geographical region, a geospatial data, a plurality of farming chemicals utilized in the geographical region, one or more irrigation practices, one or more nutrients applied on the soil, and a carbon loss impact type. Then, for each factor a weightage is assigned to determine the nitrate concentration based on the farming index to determine one or more areas of the geographical region suitable for farming with the type of agriculture crop.

Remote sensing data and other geospatial data would determine the degree of mechanized farming, such as a. Pesticides use, herbicides use, fertilizers use, and other cues for farm equipment use>tracks, roads and thereof.

b. Irrigation practices followed.

c. Nutrient application and type of impact on carbon loss. Relation between the geospatial data and the factors would be established to learn the degree of mechanized farming with a rating scale from ‘x’ to ‘y’ (wherein values of x and y are 1 and 5 respectively). The value 5 indicates highly mechanized, and 1 indicates organic/manual/less efforts-attention. Index is developed using the factors and is observed values for each attribute. Using remote sensing and other data sources, the Index=f{distance to roads, distance to equipment supplier, crop type commercial and thereof. The economic status of each geographical region and fertilizers used based on water are the supply demand factors for developing index and the weightage to each factors {−4, 4, 3, 5, 3}.

In one embodiment, distance to road is based on map or road extraction images are extracted using machine learning (ML) models or deep learning (DL) models to determine equipment supplier, crop type would be available from crop detection method. The nitrate concentration are determined in the surrounding water bodies or streams to determine the degree of fertilizer use. The ML/DL models would be developed for measuring the nitrate concentration in water. The input image pixel parameters would predict the nitrate concentration. The nitrate concentration in water bodies would be distributed in that catchment as per the area and crop type to arrive at the fertilizer use per pixel. The nitrate concentration values would be scaled and discretized into ‘p’ number of categories (e.g., where p=5). For example, crops requiring high nutrient values would be rated accordingly. Either image at a particular time of series of images and predetermine interval would be used. For example, (crop growth stage wise duration, 15, 20, 30, 30 days, for example, Rice=vegetative, reproductive, Ripening stage. Use of water hyacinth in the water bodies would be used as another proxy to indicate fertilizer use in the catchment. The extent of area covered by water hyacinth in all the water bodies in a given catchment for the given geographical region.

The agricultural crop respiration loss 208 of the system 100 determines the agricultural crop respiration loss value by obtaining the one or more input images indicating agriculture crop characteristics associated with the geographical region, and an agricultural crop index. Further, the method determines a first respiration carbon rate and a second respiration carbon rate associated with each agriculture crop and the carbon sequestration. The first respiration carbon rate is determined based on a product of crop geographical region with the respiration rate per area. The second respiration carbon rate is determined based on a product of volume, biomass, and respiration rate per volume. The carbon locked in biomass is determined based on an agriculture crop type usage classification which indicates carbon locked biomass based on a crop residue.

The agricultural crop index is a look up table of the one or more input images comprising the hyperspectral signature, the plurality of soil properties, the crop type, the crop age and a pretrained agricultural crop respiration loss 208.

The agricultural crop respiration loss 208 is related to crop biomass. For each crop type the respiration loss is determined based on basic metabolic requirements of the crop. Carbon extracted from plants respiration rate and carbon sequestration rate are measured. The specific respiration rate would be calculated using experiments and with below Equation 3 and Equation 4, $$\text{Total respiration carbon} = \text{area of crop } X \text{ respiration rate per area} \quad \text{Equation 3}$$

$$\text{Total respiration carbon} = \frac{\text{volume}}{\text{biomass } X \text{ respiration rate per volume}} \quad \text{Equation 4}$$

Usage would determine the carbon locked in biomass. Crop type classification would give the end usage category. The look up table would be prepared in case they are not available for crops of interest. If usage of crop grass/hay/residual and thereof are burned, consumed as a food, etc. then its values is 0; if the biomass is used for furniture, paper, building material and thereof, which indicates long term use then fraction of biomass would be considered as the carbon locked. This is in addition to the soil residual carbon. Crop residue used for cattle feed, composition and thereof. For example, the crop type is determined at any crop critical growth stage using spectral imagery by 1. Prepare the look up table for following values using plot experiments—
   a. Spectral signature, and its (vegetation) fraction, soil fraction, and texture/and geometric pattern, crop type, and age.
2. During the detection of crop using remote sensing data would (here monitoring time is assumed to be known, that is the date of the satellite image is known.
   a. Extract the same features over an area of interest from satellite image and create a feature vector of those values.
   b. Filter the lookup table and select lookup table entries as per the seasonal list of crops for a given region—both these values are known from the image. For example, rabbi crops are {wheat, maize, gram, sesame, mustard, peas, oats, jowar, bajra, and the like}
   c. Use look up table and match the feature vector (excluding crop type) from plot experiments.
   d. Assign the label same as the label of closet match vector.

The locked carbon 210 of the system 100 determines the locked carbon above ground crop biomass value is calculated based on the crop type, a crop age, a biomass table, the look up table, and carbon rich manures added in the soil.

In one embodiment, the carbon footprint value is the difference between the intensive tillage value of the soil carbon release and the carbon sequestered in soil value summed with the one or more agriculture crop management practices and the agricultural crop respiration loss 208 value subtracted from the locked carbon above ground crop biomass value.

Referring now to the steps of the method 300, at step 306, the one or more hardware processors 104 calculate a net carbon flux of corresponding agriculture crop based on the carbon footprint value, a data maturity index, and a difficulty level. The carbon sequestration of the crop is a total sum of the carbon footprint value, the data maturity index, and the difficulty level.

The net carbon sequestered in the land is calculated for the farmer during the season or year for determining the carbon credits. This is computed based on calculating a numeric value which is a combination (sum of) of actual carbon saved multiplied by confidence level weightage for data and process maturity, and difficulty level incentives. The net carbon flux is represented in Equation 5, $$\text{Final Score/Index} = \sum_{i=1}^{5} m_i d_i c_i \qquad \text{Equation 5}$$

where, $m_i$ is the data maturity index, $d_i$ is the difficulty level, and $c_i$ is the carbon score of $i^{th}$ factor. The data maturing index has weight levels for a scale of 1 to 5 weight levels, the difficulty levels have a scale 1 to 5 levels. The data maturity index includes one or more categories or weightages that includes direct, and Internet of Things (IoT) based measurements=1, sources from authorized and reliable agencies=0.9, remote sensing=0.9, other miscellaneous sources=0.8. If the data is not mature, then it would reduce the carbon score. The difficulty level further increases or decreases the score in non-liner fashion. For example, in first category rate would be 1, then in second category it would 1.05 time of rate in 1.1, then 1.15 times and so on, the increase of 0.05% for each category having 5 categories. Any function can be devised for these adjustment factors which is of the form variation in factors Y over X category values. The score would be a numeric value would be further divided into 5 categories for payment scale. For all the categories we define 5 default categories=low, below average, average, above average, high. Extremely high and low values might be anomalies or exception which are omitted at present. However, it can be considered if statistics changes.

Figure 4A:
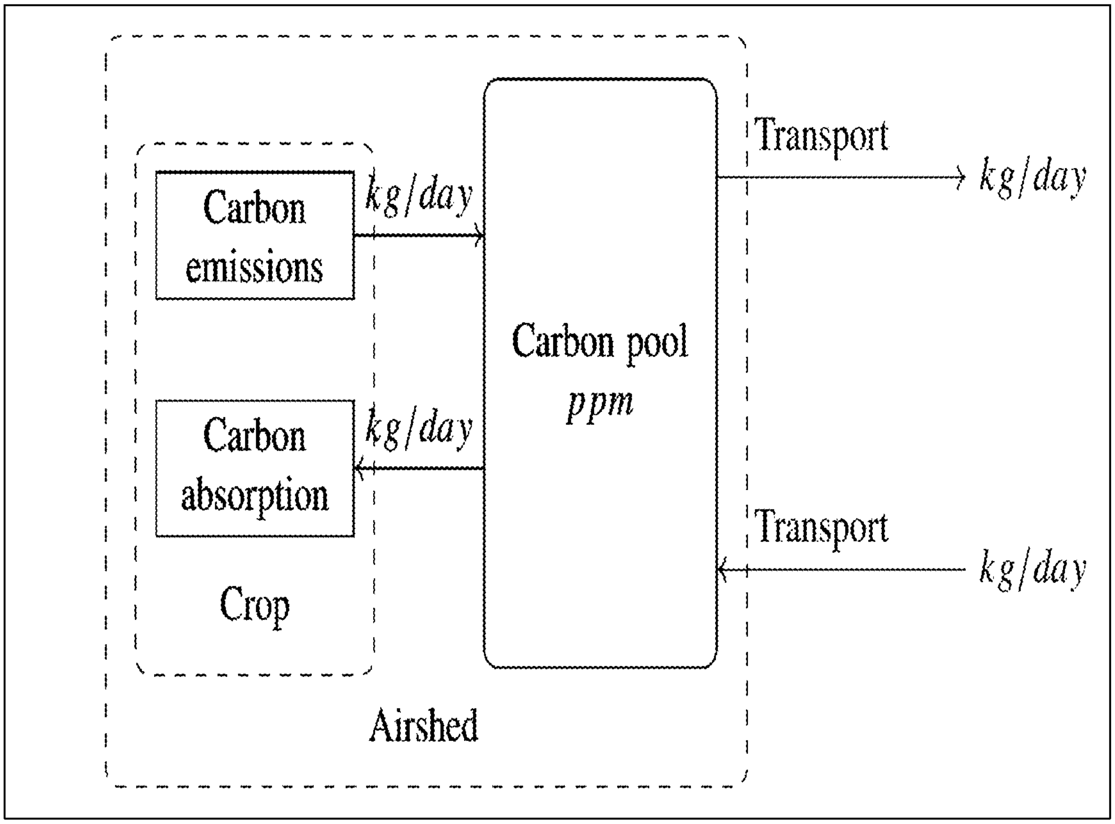
FIG. 4A and FIG. 4B illustrates an exemplary supply chain of agriculture crop using the system of FIG. 1, in accordance with some embodiments of the present disclosure.
Figure 4B:
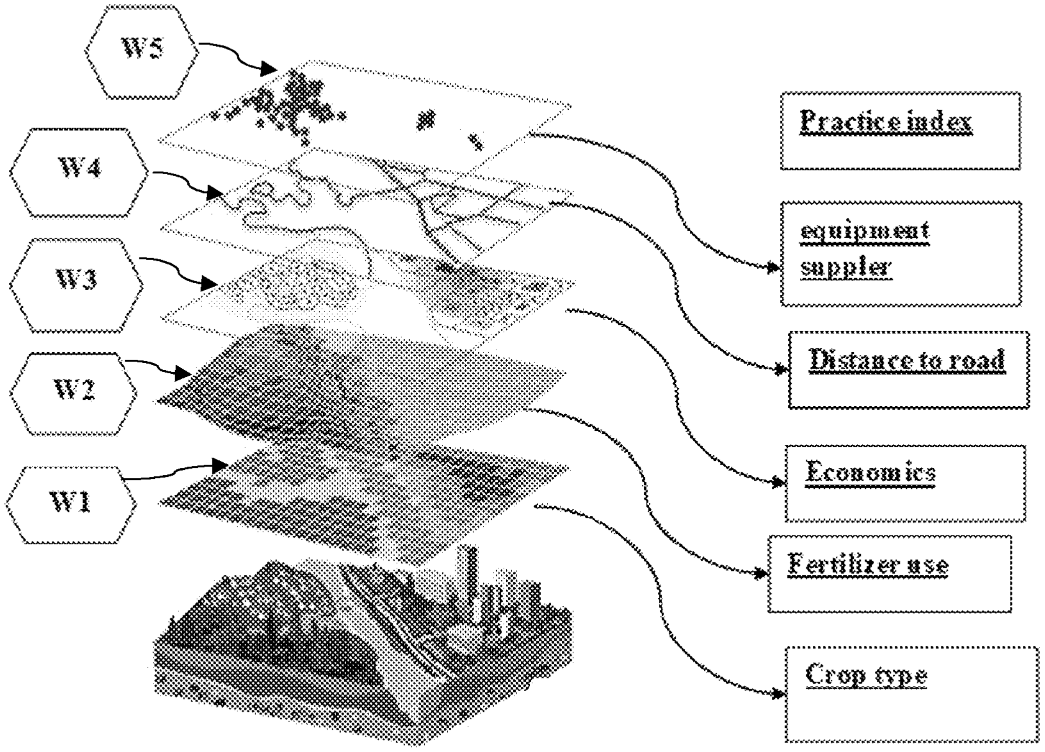

FIG. 4A and FIG. 4B illustrates an exemplary supply chain of agriculture crop using the system of FIG. 1, in accordance with some embodiments of the present disclosure. FIG. 4A and FIG. 4B depicts the supply chain of agriculture crop where:

a list of m suppliers indexed with $I=\{S_1, S_2, \ldots S_m\}$ a list of n consumers indexed with $j=\{C_1, C_2, \ldots C_n\}$ a list of units indexed with $k=\{MU_1, MU_2, \ldots MU_o\}$ The cost of supplying quantity is computed based on the sum of cost of transportation and carbon between the list of units indexed with k and the list of n consumers indexed with j and the cost of carbon as depicted in Equation 6, $$\begin{aligned} &\text{Cost of supplying } q \text{ quamtity to the } Cj = \qquad \text{Equation 6}\\ &\quad \text{cost of transportation and carbon between } \{MUk, Cj\} +\\ &\quad\quad \text{cost of transportation and carbon } \{Si, MUk\} +\\ &\quad\quad\quad \text{cost of carbon (on farm activities)} \end{aligned}$$

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of carbon sequestration. The embodiment, thus provides method and system to calculate net carbon sequestration for agriculture using remote sensing. Moreover, the embodiments herein further provide a technique to calculate net carbon sequestration. Accounting the data maturity and the difficulty levels of the carbon components such as the tillage depth assessment and determining the degree of crop management using the remote sensing data. Further, the method calculates the degree of fertilizer using degree of mechanized farming for the remote sensing data. The method further detects crop type and crop age using the remotely sensed data using the matrix of age and type for feature vector, the crop and the soil nutrient methods for carbon measurement using hyperspectral data. Additionally, the method provides optimal mapping of sources and consumers for low carbon footprint values.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method to calculate net carbon sequestration for agriculture using remote sensing data, the method comprising:

receiving, via one or more remote sensing devices, remote sensing data of one or more geographical regions, wherein the remote sensing data comprises one or more input images comprising one or more satellite or aerial images;

processing via one or more hardware processors, the remote sensing data indicating one or more agricultural crop characteristics of at least one agriculture crop associated with a geographical region of the one or more geographical regions;

calculating via the one or more hardware processors, a carbon footprint value of at least one agriculture crop by obtaining a plurality of carbon values associated with the geographical region, wherein the plurality of carbon values includes an intensive tillage value from soil carbon release, a carbon sequestered in soil value, one or more agriculture crop management practices, an agricultural crop respiration loss value, and a locked carbon value above ground crop biomass, the intensive tillage value from soil carbon release is obtained by, determining land use land cover (LULC) factor for the one or more input images to identify suitable geographical region for farming based on soil carbon release; and determining the intensive tillage value from soil carbon release for the one or more input images based on a tillage depth, a plurality of soil properties, a tillage score, and a tillage weightage, wherein the plurality of soil properties comprises a soil type, a soil texture, a soil color, a line density in furrow direction, and a tillage type, the carbon sequestered in soil value is obtained by, determining by using a pretrained carbon sequestration technique, the soil carbon sequestered value based on a carbon difference between the one or more input images indicating agriculture crop and a training dataset, wherein the carbon sequestration technique is pretrained by performing the steps of:

obtaining the training dataset comprising one or more remote sensing training images of the geographical region;

obtaining a hyperspectral data from the training dataset for quantifying soil carbon at surface and at different diagnostic depths;

measuring a hyperspectral signature for the training dataset; and applying one or more learned model coefficients over the training dataset to identify an appropriate carbon absorption band for the training dataset;

determine a local minima in a range of specific wavelengths for the carbon absorption band, and locate a start wavelength and an end wavelength for the local minima;

calculate a continuum using a second-degree polynomial joining the start wavelength and the end wavelength;

calculate a diagnostic depth for the continuum; and determine a soil carbon absorption and the diagnostic depth using a regression model; and calculating via the one or more hardware processors, a net carbon flux of least one agriculture crop based on the carbon footprint value, a data maturity index, and a difficulty level to determine carbon sequestration for agricultural field management, and/or to correctly determine carbon footprint of a geographical region to accurately predict reduction of greenhouse gas emissions reducing environmental degradation.

2. The processor implemented method as claimed in claim 1, wherein the tillage score is determined based on the soil texture, the soil color, the line density in furrow direction, and the tillage weightage is determined based on the soil texture, the soil color, and an edge density.

3. The processor implemented method as claimed in claim 1, wherein the one or more agriculture practices are utilized to calculate a nitrate concentration associated with water bodies of the one or more input images by performing the steps of:

determining a farming index of each agricultural crop based on a plurality of factors comprising the one or more remote sensing training images of the geographical region, a geospatial data, a plurality of farming chemicals utilized in the geographical region, one or more irrigation practices, one or more nutrients applied on the soil, and a carbon loss impact type;

assigning a weightage to each factor of the faming index; and determining a nitrate concentration associated with water bodies of the one or more input images of the geographical region based on the farming index to determine one or more areas of the geographical region suitable for farming with the type of agriculture crop.

4. The processor implemented method as claimed in claim 1, wherein the agricultural crop respiration loss value is determined by performing the steps of:

obtaining the one or more input images indicating agriculture crop characteristics associated with the geographical region, and an agricultural crop index;

determining a first respiration carbon rate based on a product of crop geographical region with the respiration rate per area, and a second respiration carbon rate based on a product of volume, biomass, and respiration rate per volume; and determining the carbon locked in biomass based on an agriculture crop type usage classification, wherein the usage classification indicates carbon locked biomass based on a crop residue.

5. The processor implemented method as claimed in claim 4, wherein the agricultural crop index is a look up table of the one or more input images comprising the hyperspectral signature, the plurality of soil properties, the crop type, the crop age and a pretrained agricultural crop respiration loss.

6. The processor implemented method as claimed in claim 5, wherein the locked carbon above ground crop biomass value is calculated based on the crop type, a crop age, a biomass table, the look up table, and carbon rich manures added in the soil.

7. The processor implemented method as claimed in claim 1, wherein the carbon footprint value is the difference between the intensive tillage value of the soil carbon release and the carbon sequestered in soil value summed with the one or more agriculture crop management practices and the agricultural crop respiration loss value subtracted from the locked carbon above ground crop biomass value.

8. The processor implemented method as claimed in claim 1, wherein the net carbon sequestration of the crop is a total sum of the carbon footprint value, the data maturity index, and the difficulty level.

9. The processor implemented method as claimed in claim 1, wherein the data maturity index is one or more weightage maturity indices associated with one or more crop parameters to assess crop maturity.

10. The processor implemented method as claimed in claim 1, wherein the difficulty level is a categorical rate of the carbon value obtained from the agriculture crop.

11. A system 100 to calculate net carbon sequestration for agriculture using remote sensing data comprising:

a memory (102) storing instructions;

one or more communication interfaces (106); and one or more hardware processors (104) coupled to the memory (102) via the one or more communication interfaces (106), wherein the one or more hardware processors (104) are configured by the instructions to:

receive, via one or more remote sensing devices, remote sensing data of one or more geographical regions, wherein the remote sensing data comprises one or more input images comprising one or more satellite or aerial images;

process remote sensing data comprising one or more input images indicating one or more agricultural crop characteristics of at least one agriculture crop associated with a geographical region of the one or more geographical regions;

calculate a carbon footprint value of at least one agriculture crop by obtaining a plurality of carbon values associated with the geographical region, wherein the plurality of carbon values includes an intensive tillage value from soil carbon release, a carbon sequestered in soil value, one or more agriculture crop management practices, an agricultural crop respiration loss value, and a locked carbon value above ground crop biomass, the intensive tillage value from soil carbon release is obtained by, determine land use land cover (LULC) factor for the one or more input images to identify suitable geographical region for farming based on soil carbon release; and determine the intensive tillage value from soil carbon release for the one or more input images based on a tillage depth, a plurality of soil properties, a tillage score, and a tillage weightage, wherein the plurality of soil properties comprises a soil type, a soil texture, a soil color, a line density in furrow direction, and a tillage type, the carbon sequestered in soil value is obtained by, determine by using a pretrained carbon sequestration technique, the soil carbon sequestered value based on a carbon difference between the one or more input images indicating agriculture crop and a training dataset, wherein the carbon sequestration technique is pretrained by performing the steps of:

obtain the training dataset comprising one or more remote sensing training images of the geographical region;

obtain a hyperspectral data from the training dataset for quantifying soil carbon at surface and at different diagnostic depths;

measure a hyperspectral signature for the training dataset; and apply one or more learned model coefficients over the training dataset to, identify an appropriate carbon absorption band for the training dataset;

determine a local minima in a range of specific wavelengths for the carbon absorption band, and locate a start wavelength and an end wavelength for the local minima;

calculate a continuum using a second-degree polynomial joining the start wavelength and the end wavelength;

calculate a diagnostic depth for the continuum; and determine a soil carbon absorption and the diagnostic depth using a regression model; and calculate a net carbon flux of least one agriculture crop based on the carbon footprint value, a data maturity index, and a difficulty level to determine carbon sequestration for agricultural field management, and/or to correctly determine carbon footprint of a geographical region to accurately predict reduction of greenhouse gas emissions reducing environmental degradation.

12. The system as claim in claim 11, wherein the tillage score is determined based on the soil texture, the soil color, the line density in furrow direction, and the tillage weightage is determined based on the soil texture, the soil color, and an edge density.

13. The system as claim in claim 11, wherein the one or more agriculture practices are utilized to calculate a nitrate concentration associated with water bodies of the one or more input images by performing the steps of:

determining a farming index of each agricultural crop based on a plurality of factors comprising the one or more remote sensing training images of the geographical region, a geospatial data, a plurality of farming chemicals utilized in the geographical region, one or more irrigation practices, one or more nutrients applied on the soil, and a carbon loss impact type;

assigning a weightage to each factor of the faming index; and determining a nitrate concentration associated with water bodies of the one or more input images of the geographical region based on the farming index to determine one or more areas of the geographical region suitable for farming with the type of agriculture crop.

14. One or more non-transitory machine-readable information storage mediums comprising one or more instructions which when executed by one or more hardware processors cause:

receiving, via one or more remote sensing devices, remote sensing data of one or more geographical regions, wherein the remote sensing data comprises one or more input images comprising one or more satellite or aerial images;

processing remote sensing data comprising one or more input images indicating one or more agricultural crop characteristics of at least one agriculture crop associated with a geographical region of the one or more geographical regions;

calculating a carbon footprint value of at least one agriculture crop by obtaining a plurality of carbon values associated with the geographical region, wherein the plurality of carbon values includes an intensive tillage value from soil carbon release, a carbon sequestered in soil value, one or more agriculture crop management practices, an agricultural crop respiration loss value, and a locked carbon value above ground crop biomass, the intensive tillage value from soil carbon release is obtained by, determining land use land cover (LULC) factor for the one or more input images to identify suitable geographical region for farming based on soil carbon release; and determining the intensive tillage value from soil carbon release for the one or more input images based on a tillage depth, a plurality of soil properties, a tillage score, and a tillage weightage, wherein the plurality of soil properties comprises a soil type, a soil texture, a soil color, a line density in furrow direction, and a tillage type, the carbon sequestered in soil value is obtained by, determining by using a pretrained carbon sequestration technique, the soil carbon sequestered value based on a carbon difference between the one or more input images indicating agriculture crop and a training dataset, wherein the carbon sequestration technique is pretrained by performing the steps of obtaining the training dataset comprising one or more remote sensing training images of the geographical region;

obtaining a hyperspectral data from the training dataset for quantifying soil carbon at surface and at different diagnostic depths;

measuring a hyperspectral signature for the training dataset; and applying one or more learned model coefficients over the training dataset to, identify an appropriate carbon absorption band for the training dataset;

determine a local minima in a range of specific wavelengths for the carbon absorption band, and locate a start wavelength and an end wavelength for the local minima;

calculate a continuum using a second-degree polynomial joining the start wavelength and the end wavelength;

calculate a diagnostic depth for the continuum; and determine a soil carbon absorption and the diagnostic depth using a regression model; and calculating a net carbon flux of least one agriculture crop based on the carbon footprint value, a data maturity index, and a difficulty level to determine carbon sequestration for agricultural field management, and/or to correctly determine carbon footprint of a geographical region to accurately predict reduction of greenhouse gas emissions reducing environmental degradation.

* * * * *